(12) United States Patent
Fukada et al.

(10) Patent No.: US 8,054,064 B2
(45) Date of Patent: Nov. 8, 2011

(54) SENSOR HOLDER WITH A WHEEL BEARING APPARATUS INCORPORATED WITH A WHEEL SPEED DETECTING APPARATUS INCLUDING AN ANNULAR FITTING MEMBER IN THE SENSOR HOLDER AND A SEAL POSITIONED BETWEEN THE ANNULAR FITTING MEMBER AND AN OUTER CIRCUMFERENCE OF AN INNER RING

(75) Inventors: Kikuo Fukada, Iwata (JP); Hiroshi Kawamura, Iwata (JP); Takayuki Norimatsu, Iwata (JP); Yujiro Ono, Iwata (JP); Syougo Suzuki, Iwata (JP)

(73) Assignee: NTN Corporation (JP)

( * ) Notice: Subject to any disclaimer, the term of this patent is extended or adjusted under 35 U.S.C. 154(b) by 117 days.

(21) Appl. No.: 12/486,151

(22) Filed: Jun. 17, 2009

(65) Prior Publication Data
US 2009/0251133 A1 Oct. 8, 2009

Related U.S. Application Data

(63) Continuation of application No. PCT/JP2007/001369, filed on Dec. 6, 2007.

(30) Foreign Application Priority Data

Dec. 18, 2006 (JP) .................................. 2006-339367
Jan. 10, 2007 (JP) .................................. 2007-002333

(51) Int. Cl.
*G01P 3/44* (2006.01)

(52) U.S. Cl. ..................... 324/174; 324/207.25; 384/448
(58) Field of Classification Search .................. 324/174; 384/448
See application file for complete search history.

(56) References Cited

U.S. PATENT DOCUMENTS

| 6,267,509 | B1 * | 7/2001 | Morimura ..................... 384/448 |
| 7,592,798 | B2 * | 9/2009 | Yabe et al. ..................... 324/174 |
| 2005/0200350 | A1 * | 9/2005 | Tomioka ..................... 324/174 |
| 2005/0226545 | A1 | 10/2005 | Ohtsuki et al. |
| 2007/0152657 | A1 * | 7/2007 | Yabe et al. ..................... 324/174 |

FOREIGN PATENT DOCUMENTS

| JP | 2003-057070 | 2/2003 |
| JP | 2005-300289 | 10/2005 |
| JP | 2006-329663 | 12/2006 |

* cited by examiner

*Primary Examiner* — Jay Patidar
(74) *Attorney, Agent, or Firm* — Harness, Dickey & Pierce, P.L.C.

(57) ABSTRACT

A sensor holder has an encoder and a wheel speed sensor arranged opposite to the encoder, via a predetermined air gap. An annular fitting member is formed by pressing an anti-corrosive steel plate. A holding portion is formed of injection moldable synthetic resin and is integrally formed with the annular fitting member. The annular fitting member includes a cylindrical portion axially extending from an incline portion. A seal is arranged inboard of the sensor and fit between the inner circumference of the cylindrical portion of the annular fitting member and the outer circumference of the inner ring. The wheel speed sensor is embedded in the holding portion. At least a surface of the annular fitting member contacting the holding portion is roughened by shot blasting to have a surface roughness Ra of 0.8 or more.

4 Claims, 6 Drawing Sheets

[Fig 1]
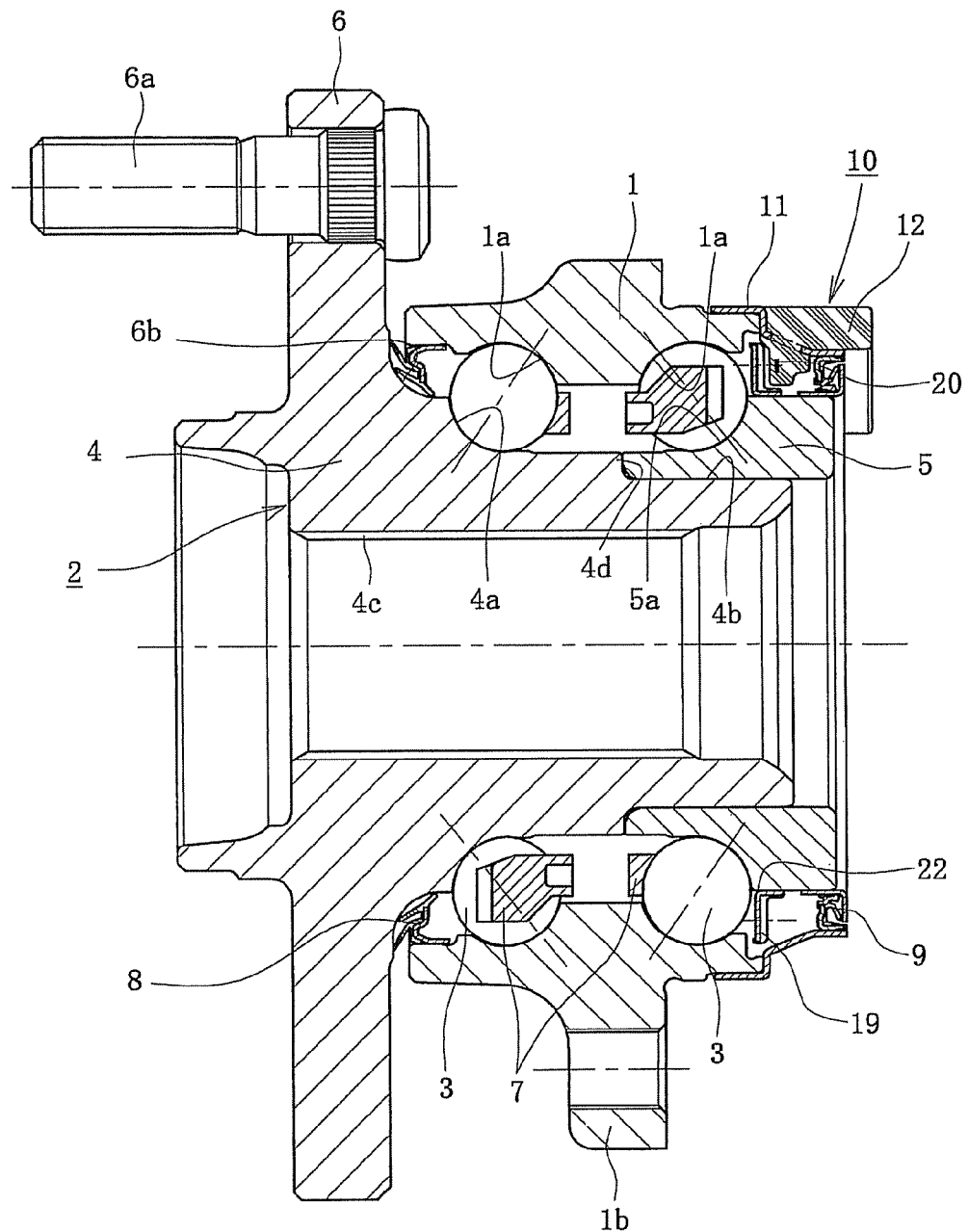

[Fig 2]
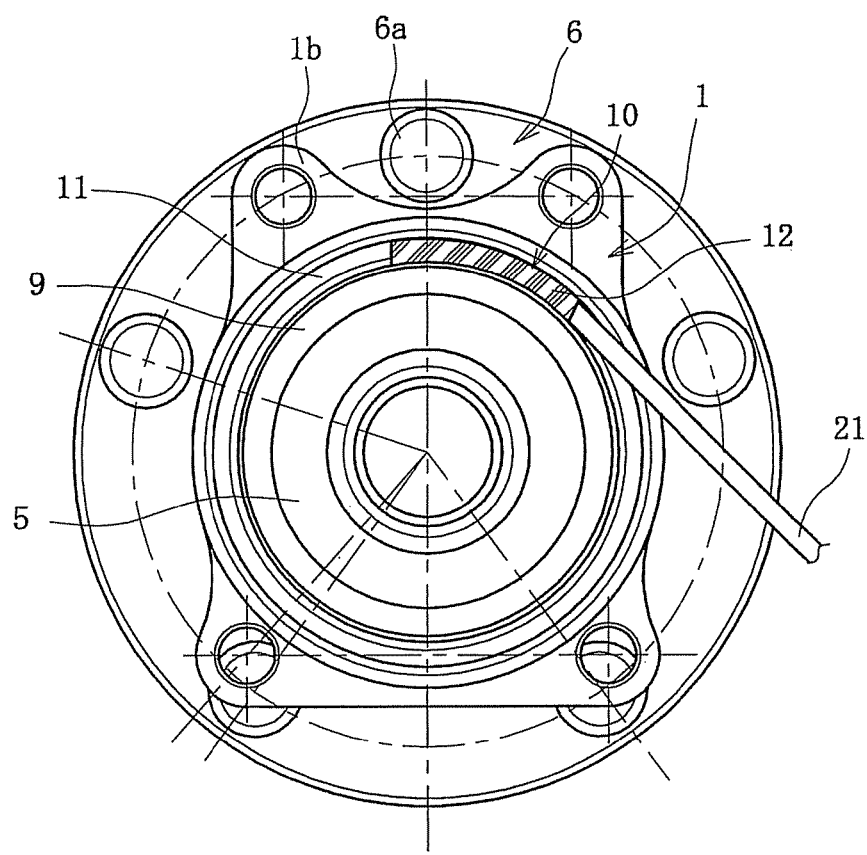

[ Fig 3 ]
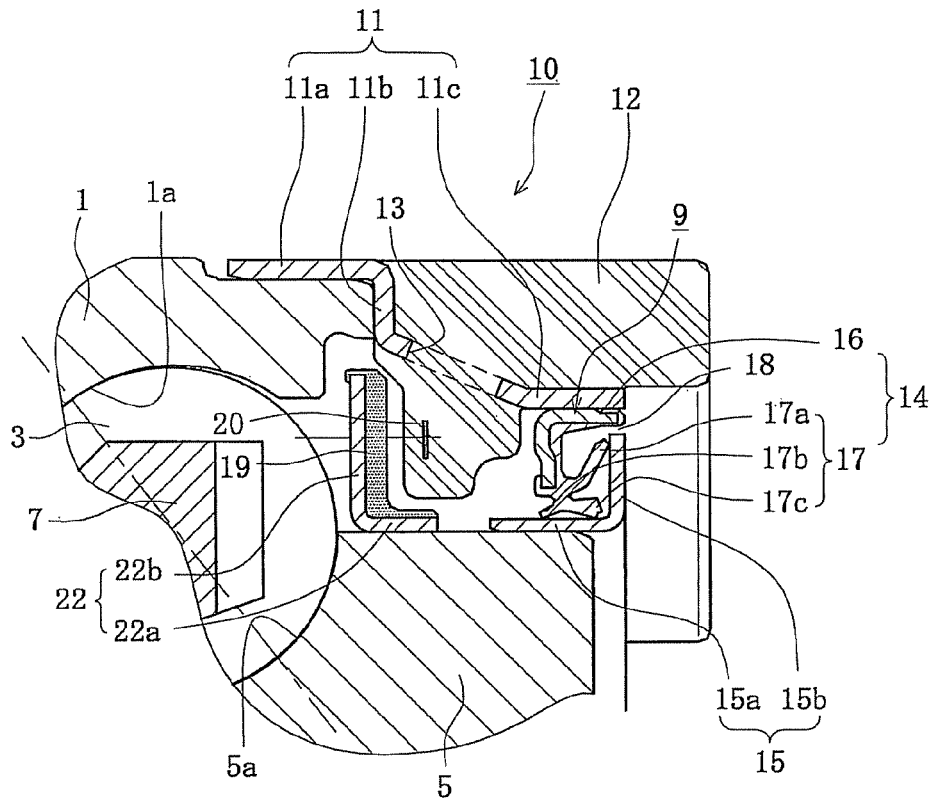
[ Fig 4 ]
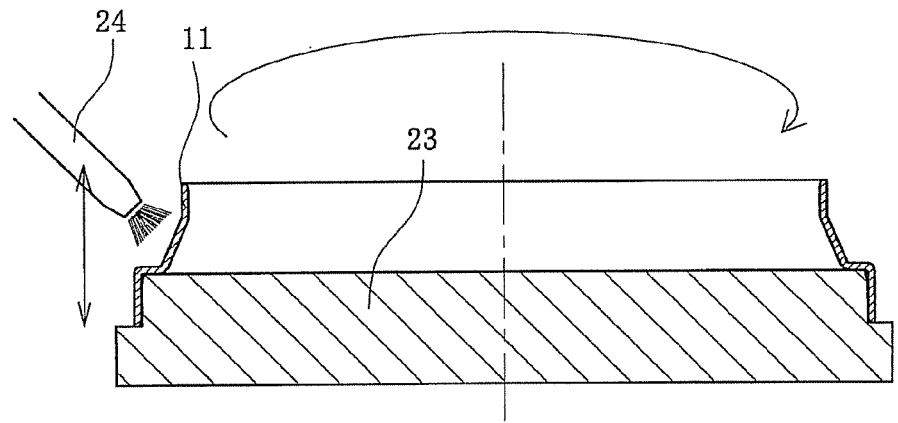

[Fig 5]
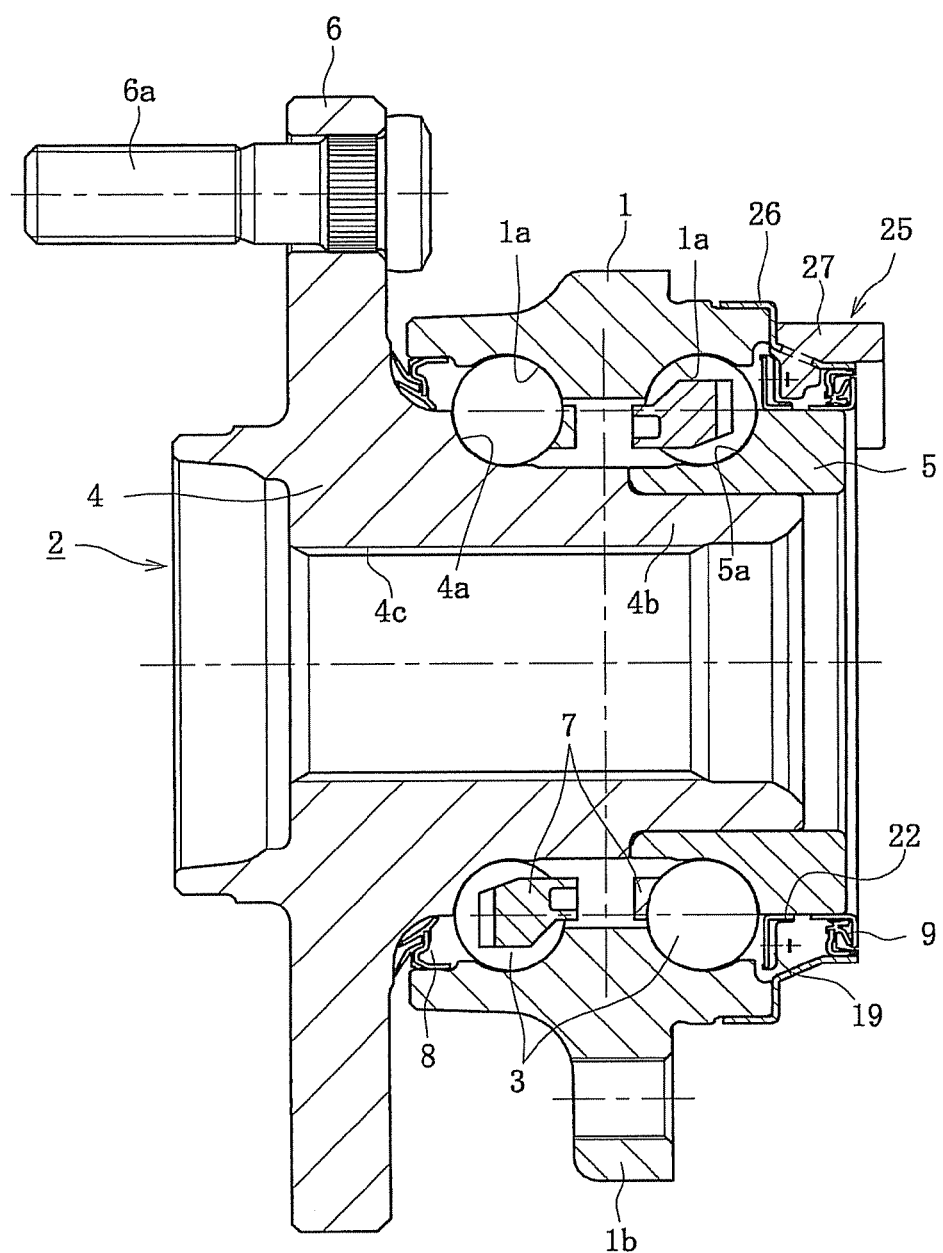

[ Fig 6 ]
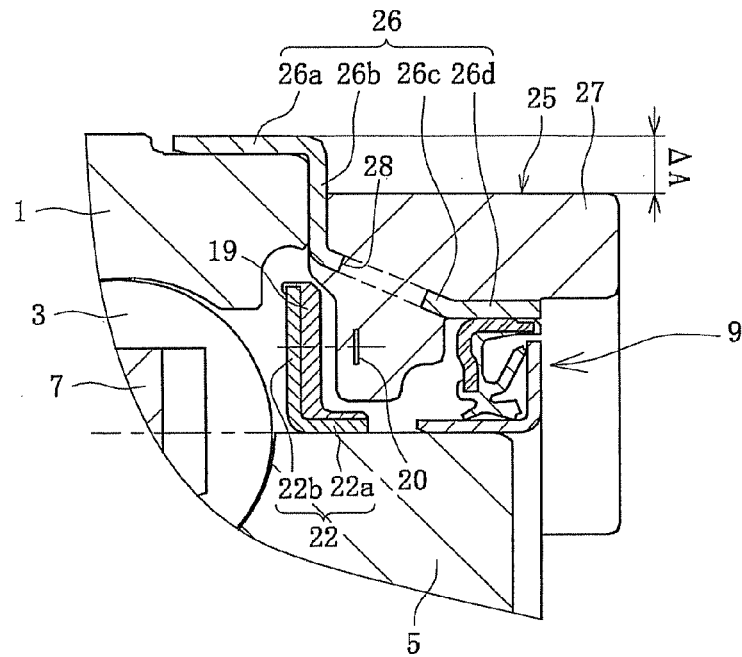
[ Fig 7 ]
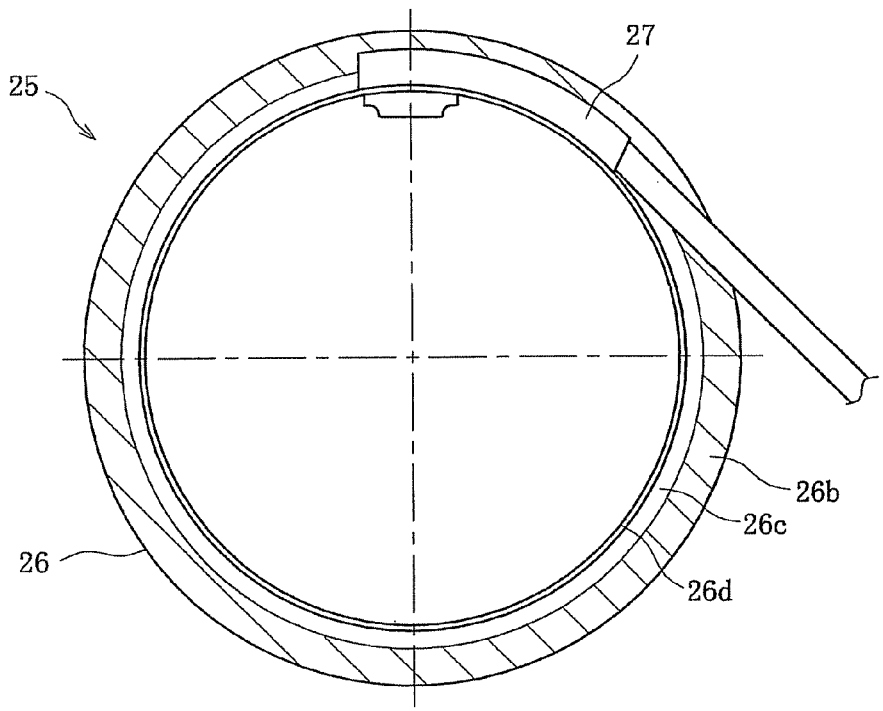

[Fig 8]
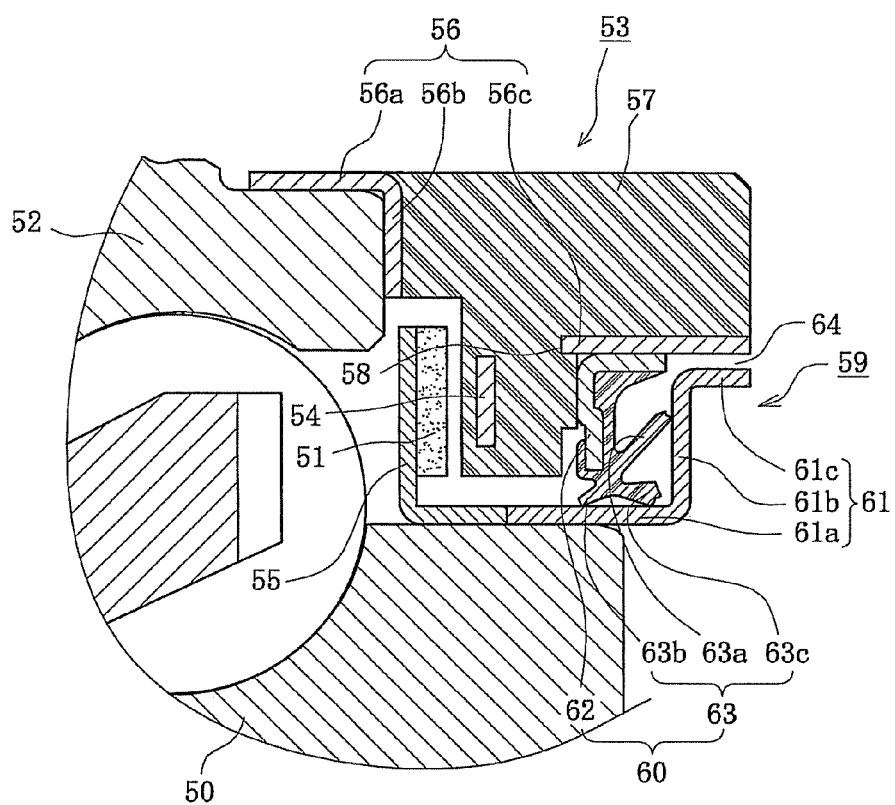

SENSOR HOLDER WITH A WHEEL BEARING APPARATUS INCORPORATED WITH A WHEEL SPEED DETECTING APPARATUS INCLUDING AN ANNULAR FITTING MEMBER IN THE SENSOR HOLDER AND A SEAL POSITIONED BETWEEN THE ANNULAR FITTING MEMBER AND AN OUTER CIRCUMFERENCE OF AN INNER RING

CROSS-REFERENCE TO RELATED APPLICATIONS

This application is a continuation of International Application No. PCT/JP2007/001369, filed Dec. 6, 2007, which claims priority to Japanese Application Nos. 2006-339367, filed Dec. 18, 2006 and 2007-002333, filed Jan. 10, 2007. The disclosures of the above applications are incorporated herein by reference.

FIELD

The present disclosure relates to a sensor holder having a wheel speed sensor to detect wheel speed of a vehicle and to a wheel bearing apparatus incorporated with a wheel speed detecting apparatus.

BACKGROUND

Wheel bearing apparatus that supports a vehicle wheel relative to a suspension apparatus and that incorporates a wheel speed detecting apparatus to detect rotation speed of the vehicle wheel to control anti-lock braking systems (ABS) are known. Such a bearing apparatus generally includes a wheel speed detecting apparatus with a magnetic encoder having magnetic poles alternately arranged along its circumference. Also, it is integrated in a sealing apparatus arranged between inner and outer members to contain rolling elements (balls) therebetween. A wheel speed detecting sensor detects the variation in the magnetic poles of the magnetic encoder according to the rotation of the wheel.

The wheel speed sensor is usually mounted on a knuckle after the wheel bearing apparatus is mounted onto the knuckle to form a suspension apparatus. Wheel bearing apparatus that incorporates a wheel speed detecting apparatus where a wheel speed detecting sensor is incorporated into the wheel bearing in order to reduce the size of the wheel bearing apparatus as well as to eliminate troublesome air gap adjustment between the wheel speed sensor and the magnetic encoder have been proposed.

An example of a wheel bearing apparatus incorporated with a wheel speed detecting apparatus is shown in FIG. 8. The wheel speed detecting apparatus has a magnetic encoder 51 fit onto an inner ring 50. An annular sensor holder 53 is mounted at one end of an outer member 52 opposite to the magnetic encoder 51. A wheel speed sensor 54 is embedded in a holding portion 57 that forms the sensor holder 53. It is arranged opposite to the magnetic encoder 51 via a predetermined axial gap.

In the description below, the outer side of the bearing apparatus, when it is mounted on a vehicle, is referred to the "outer side" (the left side in a drawing), and the inner side of a bearing apparatus, when it is mounted on a vehicle, is referred to as the "inner side" (the right side in a drawing).

The magnetic encoder 51 comprises a rubber magnet formed of elastomer mingled with magnetic powder, such as ferrite. It constructs a rotary encoder having N and S poles alternately arranged along its circumference to detect the wheel speed. The magnetic encoder 51 is integrally bonded, via vulcanized adhesion, to the side of an annular base 55. The base 55 is formed by pressing a steel plate to have an L-shaped cross-section.

The sensor holder 53 has an annular fitting member 56 mounted on one end of the outer member 52. The holding portion 57 is integrally molded with the annular fitting member 56. The annular fitting member 56 is made by pressing stainless steel that has corrosive resistance. A fitting portion 56a is press fit onto the outer circumference of the outer member 52. A flange portion 56b extends radially inward from the fitting portion 56a. A cylindrical portion 56c axially extends from the flange portion 56b. A plurality of apertures 58 is formed in the cylindrical portion 56c along its circumference so as to firmly grip the integrally molded holding portion 57.

The seal 59 is arranged at the inner side of the magnetic encoder 51 via a sensor holder 53. The seal 59 includes an annular sealing plate 60 and a slinger 61. The sealing plate 60 has a metal core 62 formed with an L-shaped cross-section that is fit into the cylindrical portion 56c of the annular fitting member 56. A sealing member 63 is integrally bonded to the metal core 62, via vulcanized adhesion. The sealing member 63 has an integrally molded side lip 63a, grease lip 63b and middle lip 63c.

The slinger 61 is made by pressing stainless steel that has corrosive resistance. The slinger 61 has a cylindrical portion 61a press fit into the inner ring 50. A standing portion 61b extends radially outward from the cylindrical portion 61a. An annular tongue portion 61c projects axially from the tip of the standing portion 61b. The tongue portion 61c is opposite to the cylindrical portion 56c of the annular fitting member 56, via a slight gap, and forms a labyrinth seal 64 therebetween. The side lip 63a slidably contacts the standing portion 61b of the slinger 61. The grease lip 63b and the middle lip 63c slidably contact the cylindrical portion 61a of the slinger 61.

According to such a structure, since the wheel speed sensor 54 is embedded in the annular sensor holder 53, the seal 59 is arranged at the inner side of the wheel speed sensor 54. Additionally, the labyrinth seal 64 is arranged at the inner side of the seal 59. Thus, it is possible to prevent the entry of foreign matters, such as magnetic powders, into a space between the magnetic encoder 51 and the wheel speed sensor 54 under severe running conditions of a vehicle. Thus, this improves the reliability of the detection of the wheel speed. (Japanese Laid-open Patent Publication No. 300289/2005).

However, the annular fitting member 56 and the holding portion integrally molded with the annular fitting member 56 may be separated when they are exposed to severe conditions, such as muddy water or salt water or high or low temperature, for a long term. This would cause an increase of the air gap between the magnetic encoder 51 and the wheel speed sensor 54. Thus, the desired exact detection of wheel speed cannot be performed.

In addition, it is impossible to directly apply pressing force on the annular fitting member 56 when this fitting member 56 is press fit onto the outer member 52 using a pressing tool having a substantially C-configuration. The pressing force has to be applied on the end face of the holding portion 57 of an elastic material. This sometimes causes insufficient contact between the annular fitting member 56 and the end face of the outer member 52. Thus, it is difficult to always have a constant air gap between the magnetic encoder 51 and the sensor holder 57.

SUMMARY

It is, therefore, an object of the present disclosure to provide a sensor holder that can keep the air gap between the encoder and the wheel speed sensor for a long term and perform a desired detection of the wheel speed.

It is another object to provide a wheel bearing apparatus incorporated with a wheel speed detecting apparatus that is compact and can prevent the entry of foreign matters into the detecting portion. Thus, this improves its durability and reliability.

It is further object to provide a wheel bearing apparatus incorporated with a wheel speed detecting apparatus that provides air gap control with higher accuracy and does not have a sealing trouble. Thus, this improves the reliability of wheel speed detection.

For achieving the objects, a sensor holder comprises an encoder formed with a circumference that varies alternately and equidistantly. A wheel speed sensor is arranged opposite to the encoder, via a predetermined thickness air gap. The sensor holder further comprises an annular fitting member formed by pressing an anti-corrosive steel plate. A holding portion, formed from injection moldable synthetic resin, is integral with the annular fitting member. The wheel speed sensor is embedded in the holding portion. At least a surface of the annular fitting member contacting the holding portion is roughened by shot blasting to have a surface roughness of Ra 0.8 or more.

The wheel speed sensor is arranged opposite to the encoder, via a predetermined air gap. The sensor holder further comprises an annular fitting member formed by pressing an anti-corrosive steel plate. A holding portion, formed of injection moldable synthetic resin, is integral with the annular fitting member. The wheel speed sensor is embedded in the holding portion. At least a surface of the annular fitting member contacting with the holding portion is roughened by shot blasting to have a surface roughness of Ra 0.8 or more. Thus, it is possible to increase irregular portions and thus the area on the surface contacting the holding portion. Accordingly, the adhesiveness between the annular fitting member and the holding portion of the sensor holder can be increased. Thus, it is possible to prevent the separation of the holding portion from the annular fitting member for a long term. Accordingly, this achieves a desired wheel speed detection while keeping the air gap between the encoder and the wheel speed sensor.

The encoder comprises a rubber magnet formed of elastomer mingled with magnetic powder that forms a rotary encoder to detect the wheel speed. The magnet has N and S poles alternately arranged along its circumference. The wheel speed sensor has a magnetic detecting element varying its characteristics in accordance with the magnetic flux. This makes it possible to perform the wheel speed detection with low cost and high reliability.

A step is formed between the outer circumference of the holding portion and the outer circumference of the annular fitting member. This makes it possible to press, by a press fit tool, not only the end face of the holding portion but also the exposed side face of the annular fitting member to remove a portion of the holding portion to form the step. Accordingly, it is possible to use a pressing tool having an annular configuration not a substantially C-shaped configuration. Thus, this achieves the air gap control with high accuracy and wheel speed detection with high reliability without any sealing trouble.

The step has an annular configuration with a constant width along the circumference of the holding portion. This makes it possible to make the configuration of the pressing tool annular. Thus, it makes the pressing force accordingly the pressing displacement constant around the circumference of the annular fitting member.

A wheel bearing apparatus incorporated with a wheel speed detecting apparatus comprises an outer member integrally formed on its outer circumference, with a body mounting flange. The body mounting flange is to be mounted on a suspension apparatus of a vehicle. The inner circumference of the outer member has double row outer raceway surfaces. An inner member includes a wheel hub and at least one inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed with double row inner raceway surfaces on their outer circumferences. The double row inner raceway surfaces are opposite to the double row outer raceway surfaces. Double row rolling elements are contained between the inner and outer raceway surfaces of the inner and outer members. A wheel speed detecting apparatus detects a wheel rotational speed of a vehicle. An encoder is fit onto the outer circumference of the inner ring. An annular fitting member of a sensor holder is press fit onto the end of the outer member. The seal is arranged at the inner side of the encoder via a holding portion of the sensor holder. At least a surface of the annular fitting member contacting the holding portion is roughened by shot blasting to have a surface roughness of Ra 0.8 or more.

The wheel bearing apparatus incorporates a wheel speed detecting apparatus of the inner ring rotation type. An encoder is fit onto the outer circumference of the inner ring. An annular fitting member of a sensor holder is press fit onto the end of the outer member. A seal is arranged at the inner side of the encoder via a holding portion of the sensor holder. At least a surface of the annular fitting member contacting with the holding portion is roughened by shot blasting to have the surface roughness of Ra 0.8 or more. Thus, it is possible to provide a wheel bearing apparatus incorporated with a wheel speed detecting apparatus that can prevent entry of foreign matters, such as magnetic powders, into a space between the magnetic encoder and the wheel speed sensor under a severe running condition of a vehicle and thus can improve the reliability of detection of wheel speed.

The annular fitting member comprises a fitting portion press fit onto the circumference of an end of the outer member. A flange portion extends radially inward from the fitting portion. A cylindrical portion axially extends from the flange portion. The seal is mounted in an annular opening formed between the cylindrical portion and the inner ring. This makes it possible to reduce the radial dimension of the bearing apparatus, to make its surroundings such as the wheel speed sensor simple and thus to further improve its assembling workability.

The seal comprises an annular sealing plate and a slinger. Each is formed with an L-shaped cross-section. They are arranged in an annular opening formed between the cylindrical portion of the annular fitting member and the inner ring so that they oppose each other. The sealing plate comprises a metal core fit into the cylindrical portion of the annular fitting member. A sealing member is integrally bonded to the metal core, via vulcanized adhesion. A side lip slidably contacts the slinger. This achieves excellent sealability and seals the detecting portion which includes the encoder and the wheel speed sensor from the outside of the bearing apparatus.

A step is formed between the outer circumference of the holding portion and the outer circumference of the annular fitting member. This achieves the air gap control of high accuracy and wheel speed detection of high reliability without any sealing trouble.

The step has an annular configuration having a constant width along the circumference of the holding portion. This makes it possible to make the configuration of the pressing tool annular. Thus, this makes the pressing force and the pressing displacement constant around the circumference of the annular fitting member as well as achieving high accuracy control of the air gap.

The sensor holder comprises an encoder formed so that its characteristics relating to its circumference varies alternately and equidistantly. A wheel speed sensor is arranged opposite to the encoder, via a predetermined air gap. The sensor holder further comprises an annular fitting member formed by pressing an anti-corrosive steel plate. A holding portion is formed of injection moldable synthetic resin that is integrally formed with the annular fitting member. The wheel speed sensor is embedded in the holding portion. At least a surface of the annular fitting member contacting with the holding portion is roughened by shot blasting to have a surface roughness of Ra 0.8 or more. Thus, it is possible to increase the irregular portions and the area on the surface contacting the holding portion. Accordingly, the adhesiveness between the annular fitting member and the holding portion of the sensor holder can be increased. Thus, it is possible to prevent the separation of the holding portion from the annular fitting member for a long term. Accordingly, it is possible to achieve a desired wheel speed detection while keeping the air gap thickness constant between the encoder and the wheel speed sensor.

The wheel bearing apparatus incorporated with a wheel speed detecting apparatus comprises an outer member integrally formed on its outer circumference with a body mounting flange to be mounted on a suspension apparatus of a vehicle. The inner circumference of the outer member includes double row outer raceway surfaces. An inner member includes a wheel hub and at least one inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed, on their outer circumferences, with double row inner raceway surfaces opposite to the double row outer raceway surfaces. Double row rolling elements are contained between the inner and outer raceway surfaces of the inner and outer members. A wheel speed detecting apparatus detects a wheel rotational speed of a vehicle. An encoder is fit onto the outer circumference of the inner ring. An annular fitting member of a sensor holder is press fit onto the end of the outer member. A seal is arranged at the inner side of the encoder via a holding portion of the sensor holder. Thus, it is possible to provide a wheel bearing apparatus incorporated with a wheel speed detecting apparatus that can prevent entry of foreign matters, such as magnetic powders, into a space between the magnetic encoder and the wheel speed sensor under severe running condition of the vehicle. Thus, it can improve the detection wheel speed reliability.

A sensor holder comprises a wheel speed sensor arranged opposite to an annular encoder, via a predetermined air gap. The encoder comprises a rubber magnet formed of an elastomer mingled with magnetic powder and constructed as a rotary encoder having N and S poles alternately arranged along its circumference to detect the wheel speed. The wheel speed sensor has a magnetic detecting element varying its characteristics in accordance with the magnetic flux. The sensor holder further comprises an annular fitting member formed by pressing an anti-corrosive steel plate. A holding portion formed of injection moldable synthetic resin is integrally formed with the annular fitting member. The wheel speed sensor is embedded in the holding portion. At least a surface of the annular fitting member contacting the holding portion is roughened by shot blasting to have the surface roughness of Ra 0.8 or more.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of a first embodiment of a wheel bearing apparatus incorporated with a wheel speed detecting apparatus.

FIG. 2 is a side elevation view of FIG. 1.

FIG. 3 is a partially enlarged view of FIG. 1.

FIG. 4 is an explanatory view of a shot blasting process of an annular fitting member.

FIG. 5 is a longitudinal-section view of a second embodiment of a wheel bearing apparatus incorporated with a wheel speed detecting apparatus.

FIG. 6 is a partially enlarged view of FIG. 5.

FIG. 7 is a side elevation view of a sensor holder.

FIG. 8 is a partially enlarged longitudinal-section view of a prior art wheel bearing apparatus incorporated with a wheel speed detecting apparatus.

DETAILED DESCRIPTION

Preferred embodiments of the present disclosure will be described with reference to accompanied drawings.

FIG. 1 is a longitudinal-section view of a first embodiment of a wheel bearing apparatus incorporated with a wheel speed detecting apparatus. FIG. 2 is a side elevation view of FIG. 1. FIG. 3 is a partially enlarged view of FIG. 1. FIG. 4 is an explanatory view of a shot blasting process of an annular fitting member.

The wheel bearing apparatus incorporated with a wheel speed detecting apparatus of the present disclosure is a so-called "third generation" type. It comprises an outer member 1, an inner member 2, and double row rolling elements (balls) 3, 3. The outer member 1 is made of medium carbon steel such as S53C including carbon of 0.40~0.80% by weight. The outer member 1 is integrally formed, on its outer circumference, with a body mounting flange 1b. The flange 1b is adapted to be mounted on a knuckle (not shown). The outer member inner circumference includes double row outer raceway surfaces 1a, 1a. The surfaces 1a, 1a are hardened by high frequency induction quenching to have a surface hardness of 58~64 HRC.

The inner member 2 comprises the wheel hub 4 and an inner ring 5 press fit onto the wheel hub 4. The wheel hub 4 is integrally formed, on its outer side end, with a wheel mounting flange 6 to mount a wheel (not shown). The wheel hub outer circumference has one (outer side) inner raceway surface 4a. A cylindrical portion 4b axially extends from the inner raceway surface 4a. The wheel hub inner circumference includes a serration (or spline) 4c for torque transmission. In addition, hub bolts 6a are secured on the wheel mounting flange 6 at its circumferentially equidistant positions.

The wheel hub 4 is made of medium carbon steel such as S53C including carbon of 0.40~0.80% by weight. It is hardened by high frequency induction hardening to have a surface hardness of 58~64 HRC in a region from a base 6b of the wheel mounting flange 6, which the outer side seal 8 slidably contacts, to the cylindrical portion 4b via the inner raceway surface 4a.

The inner ring 5 is formed, on its outer circumference, with the other (inner side) inner raceway surface 5a. The inner raceway surface 5a corresponds to the other of the double row outer raceway surfaces 1a, 1a. The inner ring 5 is press fit onto the cylindrical portion 4b of the wheel hub 4, via a predetermined interference. The inner ring 5 is formed of high carbon chrome steel such as SUJ2. It is dip hardened to its core to have a hardness of 58~64 HRC.

The double row rolling elements 3, 3 are contained between the outer raceway surfaces 1a, 1a of the outer member 1 and the opposite arranged inner raceway surfaces 4a, 5a, respectively, of the wheel hub 4 and the inner ring 5. They are held therein by cages 7, 7. The wheel bearing apparatus forms a double row angular contact ball bearing of a so-called back-to-back duplex type. The rolling elements 3 are formed of high carbon chrome steel such as SUJ2 and are dip hardened to their core to have a hardness of 58~64 HRC. Seals 8, 9 are mounted in annular openings formed between the outer member 1 and the inner member 2. They seals 8, 9 prevent leakage of grease contained within the bearing apparatus as well as the entry of rain water or dusts into the bearing.

In this embodiment, a sensor holder 10 is fit onto the inner side end of the outer member 1. The sensor holder 10 comprises an annular fitting member 11 and a holding portion 12 as clearly shown in an enlarged view of FIG. 3. The annular fitting member 11 is formed wholly as an annular body. It includes a cylindrical fitting portion 11a that is press fit onto the outer circumference of the outer member 1. A flange portion 11b extends radially inward from the fitting portion 11a. A cylindrical portion 11c extends axially from the flange portion 11b.

The annular fitting member 11 is made by pressing a steel plate such as an austenitic stainless steel sheet (JIS SUS 304 etc.) or a preserved cold rolled sheet (JIS SPCC etc.). The holding portion 12 is integrally molded with the annular fitting member 11 through several apertures 13 on the cylindrical portion 11c. This firmly grips the synthetic resin onto the holding portion 12.

The holding portion 12 is formed of synthetic resin able to be injection molded, such as PA (polyamide) 66. A wheel speed sensor 20 is embedded in it. The wheel speed sensor 20 is arranged opposite to a magnetic encoder 19, via a predetermined axial gap. The sensor 20 comprises a magnetic detecting element such as a Hall element, a magnetic resistance element (MR element) etc. to change characteristics in accordance with the flowing direction of the magnetic flux, and an IC incorporated with a waveform shaping circuit for shaping the output waveform of the magnetic detecting element. This enables performance of wheel speed detection at high reliability.

The inner side seal 9 comprises an annular sealing plate 14 and a slinger 15. One has a substantially "L"-shaped cross-section. They are arranged opposite toward each other in an annular opening formed between the sensor holder 10 and the inner ring 5. The sealing plate 14 includes a metal core 16 fit into the cylindrical portion 11c of the annular fitting member 11 forming the sensor holder 10. A sealing member 17 is bonded to the metal core 16, via a vulcanized adhesion.

The metal core 16 is formed by pressing a steel plate such as an austenitic stainless steel sheet (JIS SUS 304 etc.) or a preserved cold rolled sheet (JIS SPCC etc.). The sealing member 17 is formed of an elastic material, such as synthetic rubber. The sealing member 17 includes a side lip 17a, grease lip 17b and a middle lip 17c integrally formed with each other.

The slinger 15 is formed by pressing a steel plate such as an austenitic stainless steel sheet (JIS SUS 304 etc.) or a preserved cold rolled sheet (JIS SPCC etc.). The slinger has a cylindrical portion 15a and a standing portion 15b that extends radially outward from the cylindrical portion 15a. The side lip 17a of the sealing member 17 slidably contacts the standing portion 15b. The grease lip 17b and the middle lip 17c slidably contact the cylindrical portion 15a. In addition, the tip of the standing portion 15b of the slinger 15 is opposite to the sensor holder 10 via a slight gap and forms a labyrinth seal 18.

The phase of arrangement of the wheel speed sensor 20, the phase of arrangement of the holding portion 12 is set at a radially upper half from the horizontal position of the annular fitting member 11. A harness 21 is tangentially connected to the holding portion 12, as shown in FIG. 2. Accordingly, it is possible to discharge rain or muddy water entering from the outside downward. This prevents them from staying near the wheel speed sensor 20. Furthermore, winding of the harness 21 can be simply performed and the workability during assembly of the sensor holder 10 can be improved.

The magnetic encoder 19 shown in FIG. 3 is bonded to a base 22 that is press fit onto the inner ring 5. The encoder is positioned, via a predetermined axial gap (air gap), relative to the wheel speed sensor 20. It is arranged at the outer side of the inner side seal 9 via the holding portion 12 of the sensor holder 10. The base 22 is formed from a steel plate such as ferritic stainless steel sheet (JIS SUS 430 etc.) or preserved cold rolled sheet (JIS SPCC etc.). It is formed by pressing it to a generally annular configuration having a substantially L-shaped cross-section. It has a cylindrical portion 22a fit onto the inner ring 5 and a standing portion 22b that extends radially outward from the cylindrical portion 22a.

The magnetic encoder 19 is formed as a rubber magnet from an elastomer such as rubber mingled with magnetic powder. It constructs a rotary encoder to detect the wheel speed having N and S poles alternately arranged along its circumference. The magnetic encoder 19 is integrally bonded, via vulcanized adhesion, to an inner side surface of the standing portion 22b of the base 22.

As previously described, the holding portion 12, forming the sensor holder 10, is integrally molded with the annular fitting member 11. Accordingly, a surface of the annular fitting member 11 that contacts the synthetic resin forming the holding portion 12 is roughened to have a surface roughness of Ra 0.8 or more. That is, although the blank steel plate of the annular fitting member 11 usually has a surface roughness in a range of Ra 0.2~0.6, this blank steel plate is roughened by shot blasting to have a surface roughness of Ra 0.8 or more. The character "Ra" is one of the roughness geometrical parameters of JIS (JIS B0601-1994) and means the arithmetical mean roughness, a mean value of absolute value deviations from the average line.

The shot blasting is performed as shown in FIG. 4. First, the annular fitting member 11 is placed on a turn table 23. The turn table 23 is rotated. Blasting media, such as steel beads, is directed onto the annular fitting member 11 from a shot blasting nozzle 24. In this case, the shot blasting is performed under conditions using steel beads of a particle size 20 to 100 μm, blasting duration of about 90 seconds, and blasting pressure of 1 to 3 kg/cm$^2$ and by moving the nozzle 24 along an arrow in FIG. 4.

As described above, the surface of the annular fitting member 11 to be contacted with resin of the holding portion 12 is roughened by shot blasting. Its surface roughness is set to have a value of Ra 0.8 or more. The irregularity and accordingly the contacting area of the contacting surface are increased. Thus, it is possible to increase the adhesiveness between the contacting surfaces of the annular fitting member 11 and the holding portion 12. Accordingly, it is possible to prevent separation between the surfaces of the annular fitting member 11 and the holding portion 12 for a long term even if the bearing apparatus is exposed to severe circumstances. Thus, it keeps a predetermined air gap thickness between the magnetic encoder 19 and the wheel speed sensor 20 to have a desired detection of the wheel speed.

Although it is shown in the illustrated embodiment as an active type wheel speed detecting apparatus with the magnetic encoder 19 and the wheel speed sensor 20 including magnetic detecting elements such as Hall effect elements, it is possible to use a passive type wheel speed detecting apparatus, including gears, magnets and wound annular coils.

FIG. 5 is a longitudinal-section view of a second embodiment of a wheel bearing apparatus incorporated with a wheel speed detecting apparatus. FIG. 6 is a partially enlarged view of FIG. 5. FIG. 7 is a side elevation view of a sensor holder. This second embodiment is different from the first embodiment only in the structure of the sensor holder. Accordingly, the same reference numerals are used in the second embodiment to designate the same parts that have the same functions of the parts as those used in the first embodiment.

Similarly to the first embodiment, a sensor holder 25 of the second embodiment is also mounted on the inner side end of the outer member 1. It includes an annular fitting member 26 to be fit onto the end of the outer member 1 and a holding portion 27 that is integrally connected to the annular fitting member 26.

As shown in FIG. 6, the annular fitting member 26 is formed with a generally annular configuration. It has a cylindrical fitting portion 26a press fit onto the outer circumference of the outer member 1. A flange portion 26b extends radially inward from the fitting portion 26a. An inclined portion 26c angularly extends radially inward from the flange portion 26b. A cylindrical portion 26d axially extends from the inclined portion 26c. The annular fitting member 26 may be formed of anti-corrosive stainless steel plate or plated steel plate. It may be possible to apply an anti-corrosive treatment onto the annular fitting member 26 after having pressed the steel plate. The holding portion 27 is integrally molded with the annular fitting member 26 by passing through the several apertures 28 on the inclined portion 26c to firmly grip the synthetic resin of the annular fitting member 26. The seal 9 is fit into the cylindrical portion 26d of the annular fitting member 26. The sensor holder 25 is press fit onto the end of the outer member 1. The flange portion 26b is closely contacted with the end face of the outer member 1. The wheel speed sensor 20 is embedded in the holding portion 27 and arranged opposite to a magnetic encoder 19, via a predetermined radial gap.

In the second embodiment, a stepΔA is formed between the outer circumference of the holding portion 27 and the outer circumference of the fitting portion 26a of the annular fitting member 26. The diameter of the circumference of the holding portion 27 is formed smaller than the diameter of the fitting portion 26a the annular fitting member 26. Thus, a radially outward portion of the flange portion 26b is exposed from the outer circumference of the holding portion 27. The stepΔA has an annular configuration with a constant width along the circumference of the holding portion 27.

FIG. 7 shows by hatching a contacting region between the annular fitting member 26 and a press fit tool (not shown) when the annular fitting member 26 is press fit by the press fit tool. This makes it possible to press, by a press fit tool, not only the end face of the holding portion 27 but also the exposed side face of the flange portion 26b of the annular fitting member 26 removed of a portion of the holding portion 27 to form the stepΔA. Accordingly, it is possible to use a pressing tool having an annular configuration not a substantially C-shaped configuration. Thus, this achieves the high accuracy control of the air gap thickness and the wheel speed detection of high reliability without any sealing trouble.

The present disclosure has been described with reference to the preferred embodiments. Obviously, modifications and alternations will occur to those of ordinary skill in the art upon reading and understanding the preceding detailed description. It is intended that the present disclosure will be construed to include all such alternations and modifications insofar as they come within the scope of the appended claims or their equivalents.

The wheel bearing apparatus incorporated with a wheel speed detecting apparatus can be applied to wheel bearing apparatus of the inner ring rotation type including any type of wheel speed detecting apparatus.

What is claimed is:

1. A wheel bearing apparatus incorporated with a wheel speed detecting apparatus comprising:
    an outer member integrally formed on its outer circumference, with a body mounting flange, said body mounting flange to be mounted on a suspension apparatus of a vehicle, said outer member inner circumference including double row outer raceway surfaces;
    an inner member includes a wheel hub and at least one inner ring, said wheel hub integrally formed at one end with a wheel mounting flange, a cylindrical portion axially extends from the wheel mounting flange, the inner ring is press fit onto the cylindrical portion of the wheel hub, the wheel hub and the inner ring are formed, on their outer circumferences, with double row inner raceway surfaces opposite to the double row outer raceway surfaces;
    double row rolling elements are contained between the inner and outer raceway surfaces of the inner and outer members; and
    a wheel speed detecting apparatus for detecting a wheel rotation speed of a vehicle including an encoder fit onto the outer circumference of the inner ring, an annular fitting member of a sensor holder is press fit onto the end of the outer member, the annular fitting member includes a first cylindrical fitting portion press fit onto the outer circumference of the outer member, a flange portion extending radially inward from the fitting portion, an inclined portion angularly extending radially inward from the flange portion, a second cylindrical portion axially extending from the inclined portion, and that a seal is arranged at the inboard side of the sensor fit between the inner circumference of the second cylindrical portion of the annular fitting member and the outer circumference of the inner ring; and
    at least a surface of the annular fitting member contacting the holding portion is roughened by shot blasting to have a surface roughness Ra of 0.8 or more.

2. The wheel bearing apparatus incorporated with a wheel speed detecting apparatus of claim 1, wherein said seal comprises an annular sealing plate and a slinger, each formed with an L-shaped cross-section and are arranged in an annular opening formed between the cylindrical portion of the annular fitting member and the inner ring so that they oppose each other, and said sealing plate comprises a metal core fit into the cylindrical portion of the annular fitting member, and a sealing member integrally bonded to the metal core, via vulcanized adhesion, and having a side lip slidably contacting the slinger.

3. The wheel bearing apparatus incorporated with a wheel speed detecting apparatus of claim 1, wherein a step is formed between the outer circumference of the holding portion and the outer circumference of the annular fitting member.

4. The wheel bearing apparatus incorporated with a wheel speed detecting apparatus of claim 3, wherein said step has an annular configuration with a constant width along the circumference of the holding portion.

* * * * *